(12) United States Patent
Wang et al.

(10) Patent No.: US 7,757,725 B2
(45) Date of Patent: Jul. 20, 2010

(54) MANUAL VACUUM DEVICE

(76) Inventors: Kuo-Liang Wang, 5F-2, No. 9, Lane 7, Anshih St., Yancheng District, Kaohsiung City 803 (TW); Wei-Ching Lin, 4F, No. 37, Sec. 3, Chongyang Rd., Sanchong City, Taipei County 241 (TW)

( * ) Notice: Subject to any disclaimer, the term of this patent is extended or adjusted under 35 U.S.C. 154(b) by 965 days.

(21) Appl. No.: 11/528,746

(22) Filed: Sep. 28, 2006

(65) Prior Publication Data
US 2008/0078466 A1    Apr. 3, 2008

(51) Int. Cl.
*B65B 31/04* (2006.01)
(52) U.S. Cl. .............................. 141/65; 141/7; 141/302; 141/326; 215/262; 220/232
(58) Field of Classification Search ............... 141/7, 141/65, 301, 302, 325, 326; 215/262; 220/231; 222/152
See application file for complete search history.

(56) References Cited
U.S. PATENT DOCUMENTS

| 4,984,611 | A | * | 1/1991 | Takatsuki et al. | ............. | 141/65 |
|---|---|---|---|---|---|---|
| 5,944,212 | A | * | 8/1999 | Chang | ......................... | 220/212 |
| 6,131,753 | A | * | 10/2000 | Lynch | ......................... | 215/228 |
| 7,198,074 | B2 | * | 4/2007 | Lemme et al. | .............. | 141/114 |
| 7,296,598 | B2 | * | 11/2007 | Lin et al. | ....................... | 141/65 |
| 7,686,042 | B2 | * | 3/2010 | Haimi | ......................... | 141/65 |

* cited by examiner

*Primary Examiner*—Timothy L Maust
(74) *Attorney, Agent, or Firm*—Ladas and Parry LLP

(57) ABSTRACT

A manual vacuum device is introduced to provide vacuum isolation in a container. The manual vacuum device comprises a lower cover disposed on the container and an upper cover rotatably disposed on the lower cover to form a first air chamber. The lower cover includes a first air channel fluidly communicating the container with the first air chamber and a first check valve disposed within the first air channel to prevent air from flowing back to the container. The upper cover includes a second air channel fluidly communicating the first air chamber with the external environment and a second check valve disposed within the second air channel to prevent air in the external environment from flowing back to the first air chamber. The air in the container exhausts to the external environment by the rotational movement of the upper cover relative to the lower cover.

13 Claims, 11 Drawing Sheets

MANUAL VACUUM DEVICE

BACKGROUND OF THE INVENTION

1. Field of the Invention

The invention relates to a vacuum device, especially to a manual vacuum device adapted to provide vacuum isolation in a container.

2. Description of the Related Art

In general, trying to preserve goods that easily rust or perish is a commonly encountered problem, especially for food. It is well known that perishable foods stored at reduced pressure maintain their freshness longer. Food articles such as tea, sugar, nuts, fruit, preserves, etc. may be vacuum sealed in order to maintain freshness over extended periods. In general, vacuum-packed foods will begin to lose their freshness the moment the vacuum seal provided during original packaging is lost.

Therefore, a vacuum container has been developed to provide vacuum isolation for food articles in the container. It usually comprises a container combined with a vacuum device combined with the container. After the food articles are placed in the container, air is sucked out of it by the vacuum device and it is sealed. One problem the current technology has is that the vacuum device is expensive and too burdensome to use, which prevents the vacuum container from having household uses.

From the above, it can be seen that it is necessary to provide a vacuum device for the public which is compact in structure and easy to use and manufacture.

SUMMARY OF THE INVENTION

It is an object of this invention to provide a manual vacuum device adapted to provide vacuum isolation in a container.

It is another object of the present invention to provide a manual vacuum device which is compact in structure and easy to use anywhere as well as easy and inexpensive to manufacture.

It is another object of the present invention to provide a manual vacuum device wherein the vacuum level is easily adjustable.

It is a further object of the present invention to provide a manual vacuum device which is adapted to be used for a variety of containers.

It is another further object of the present invention to provide a manual vacuum device wherein the vacuum condition can be easily released.

In order to achieve the above objects, the manual vacuum device according to an embodiment of the present invention comprises a lower cover disposed on the container, said cover comprising a first cavity and a first separating body arranged in the first cavity, the first separating body comprising a first air channel fluidly communicating with the container and a first check valve disposed within the first air channel to prevent air from flowing into the container; and an upper cover comprising a second cavity and a second separating body arranged in the second cavity and rotatably disposed on the lower cover to form a first air chamber defined by the first and second separating bodies, the second separating body comprising a second air channel fluidly communicating the first air chamber with the external environment and a second check valve disposed within the second air channel to prevent air from flowing into the first air chamber from the external environment.

The air in the container flows into the first air chamber through the first air channel as the first air chamber expands by a rotational movement of the second separating body of the upper cover relative to the first separating body of the lower cover, and the air in the first air chamber flows to the external environment through the second air channel as the first air chamber contracts by a counter rotational movement of the second separating body of the upper body relative to the first separating body of the lower cover.

According to another embodiment of the present invention, the first and second separating bodies further define a second air chamber as the upper cover is rotatably disposed on the lower cover, the first separating body further comprises a third air channel fluidly communicating the container with the second air chamber and a third check valve disposed within the third air channel to prevent air from flowing into the container from the second air chamber, and the second separating body further comprises a fourth air channel fluidly communicating the second air chamber with the external environment and a fourth check valve disposed within the fourth air channel to prevent air from flowing to the second air chamber from the external environment.

The air in the container flows into the second air chamber through the third air channel as the second air chamber expands by a rotational movement of the second separating body of the upper body relative to the first separating body of the lower cover, and the air in the second air chamber flows to the external environment through the fourth air channel as the second air chamber contracts by a counter rotational movement of the second separating body of the upper body relative to the first separating body of the lower cover.

The lower cover further includes a cannular shaft linked to the container to receive a safety valve, the upper cover further includes an opening corresponding to the cannular shaft, and the safety valve is closed to fluidly separate the container from the external environment under normal conditions and is opened to fluidly communicate the container with the external environment as a difference between an atmospheric pressure outside the container and a vacuum pressure inside the container exceeds a predetermined value.

According to yet another embodiment of the present invention, the manual vacuum device comprises an air faucet, in combination with the container, including a first air channel fluidly communicating with the container and having a first check valve therein to prevent air from flowing back to the container; a lower cover disposed on the air faucet and comprising a first cavity and a first separating body arranged in the first cavity, the first separating body comprising a second air channel fluidly communicating with the first air channel and a second check valve disposed within the second air channel to prevent air from flowing back to the first air channel; and an upper cover comprising a second cavity and a second separating body arranged in the second cavity and rotatably disposed on the lower cover to form a first air chamber defined by the first and second separating bodies, the second separating body comprising a third air channel fluidly communicating the first air chamber with the external environment and a third check valve disposed within the third air channel to prevent air from flowing back to the first air chamber from the external environment.

The air in the container flows into the first air chamber through the first and second air channels as the first air chamber expands by a rotational movement of the second separating body of the upper body relative to the first separating body of the lower cover, and the air in the first air chamber flows to the external environment through the third air channel as the first air chamber contracts by a counter rotational movement of the second separating body of the upper body relative to the first separating body of the lower cover.

The above and other objects and advantages of the present invention will become apparent to those skilled in the art from the following detailed description of the invention and the accompanying drawings. However, the description is intended only to describe the preferred embodiments of the invention, but not to limit the invention in any way. Any modifications or changes that are in accordance with the spirit of the invention should be considered to fall within the scope of protection of this invention.

DETAILED DESCRIPTION OF THE INVENTION

Figure 1:
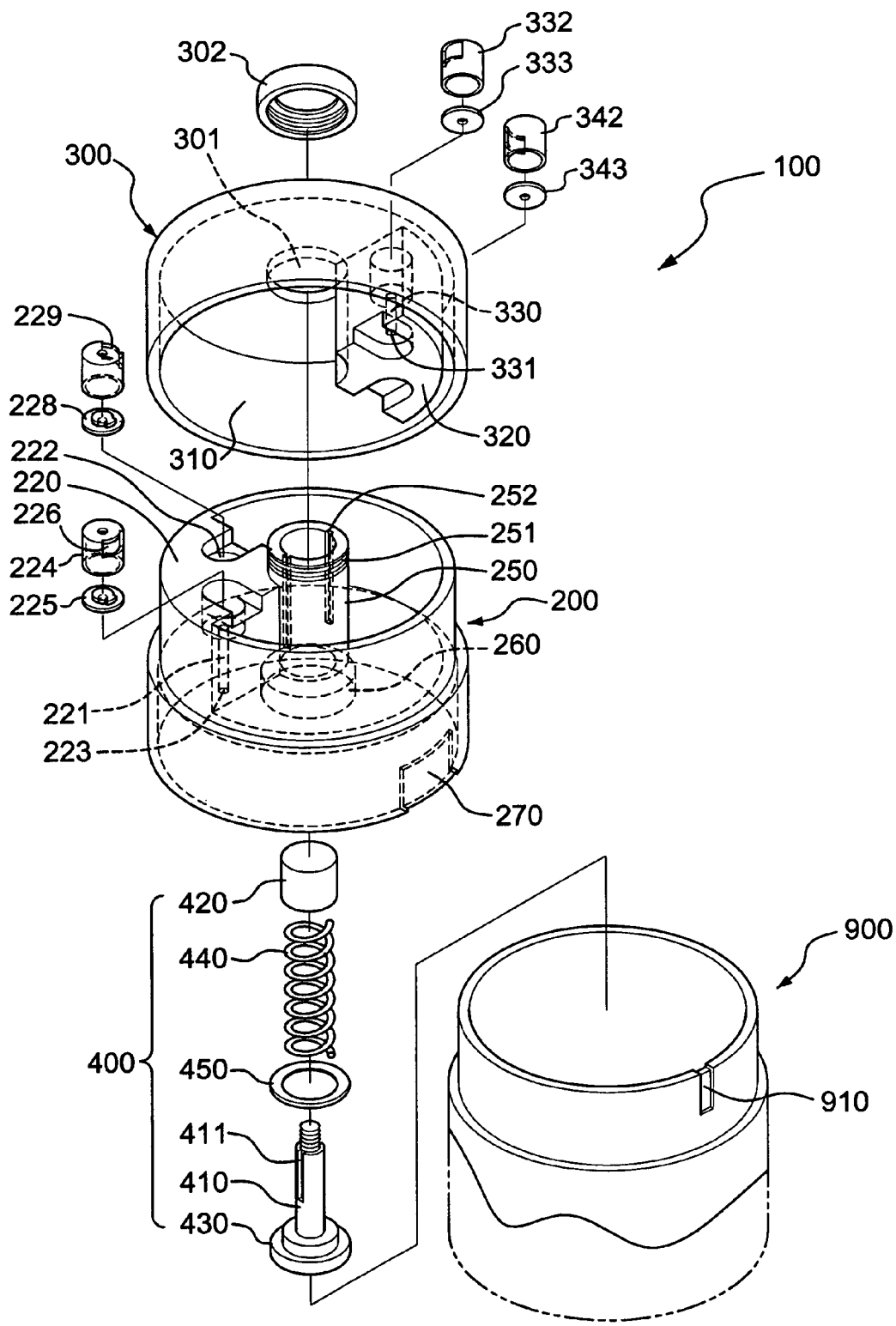
FIG. 1 illustrates an exploded view of a manual vacuum device according to a first preferred embodiment of the present invention and a container.
Figure 2:
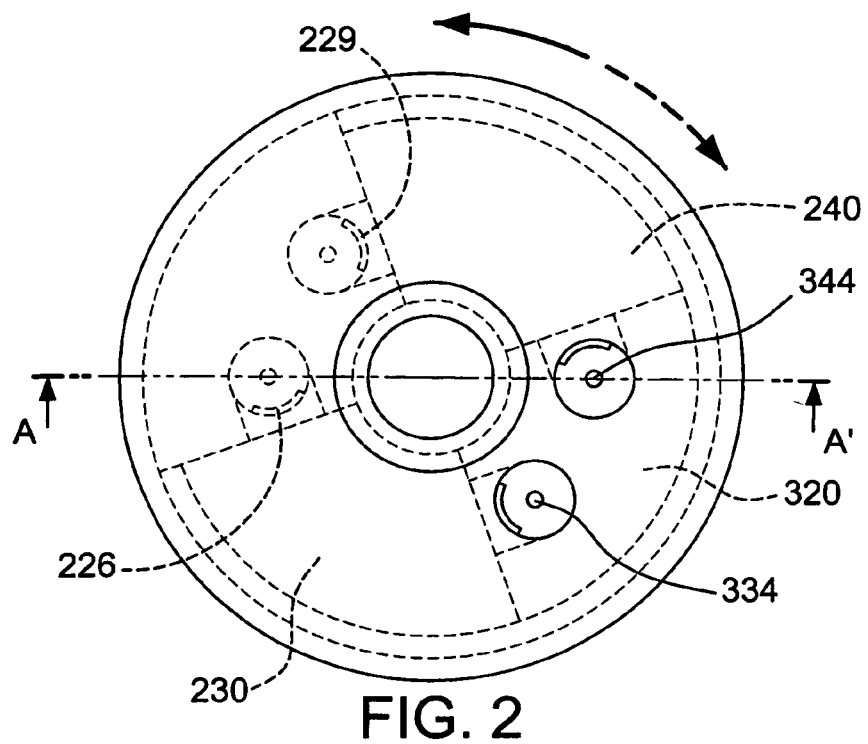
FIG. 2 illustrates a top view of a manual vacuum device according to a first preferred embodiment of the present invention fitted to a container.
Figure 3:
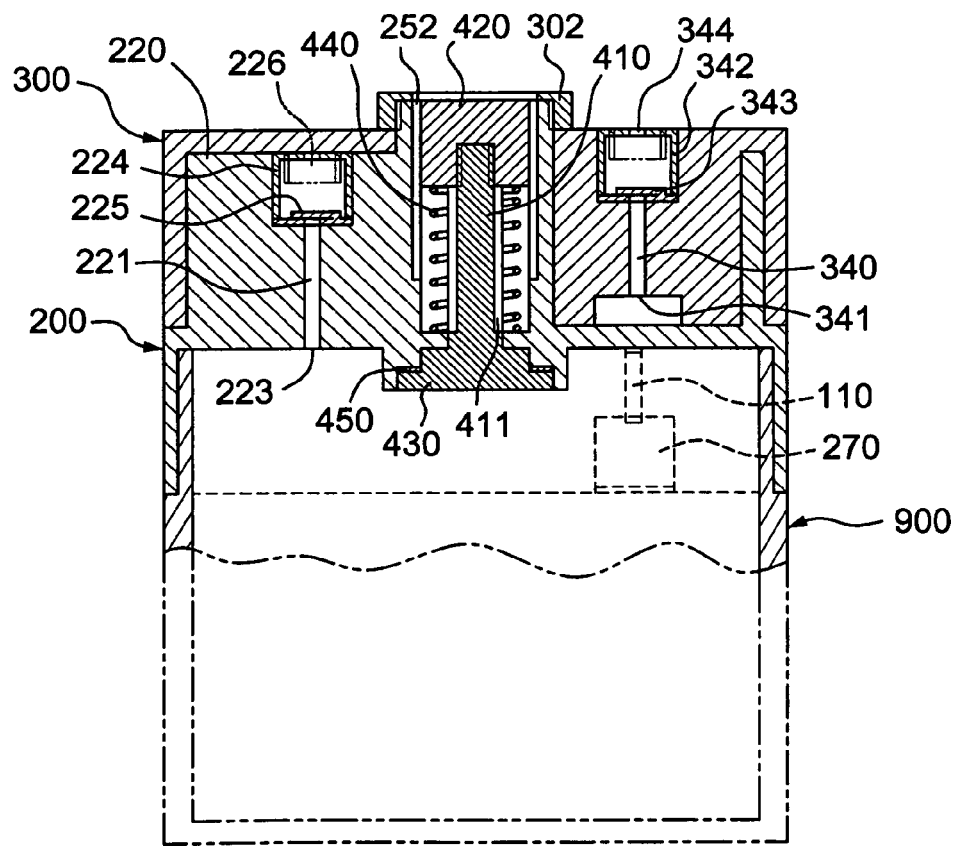
FIG. 3 illustrates a cross-sectional view of a manual vacuum device according to a first preferred embodiment of the present invention fitted to a container taken along the A-A' line in FIG. 2.

FIG. 1 illustrates an exploded view of a manual vacuum device according to a first preferred embodiment of the present invention with a container. FIG. 2 illustrates a top view of a manual vacuum device according to the first preferred embodiment of the present invention fitted to a container. FIG. 3 illustrates a cross-sectional view of a manual vacuum device according to the first preferred embodiment of the present invention fitted to a container taken along the A-A' line in FIG. 2. As shown in the above figures, the manual vacuum device 100 of the present invention is adapted to provide vacuum isolation in a container 900, such as a can, bottle or jug.

The manual vacuum device 100 comprises a cylindrical lower cover 200 disposed on the container 900, and a cylindrical upper cover 300 rotatably disposed on the lower cover 200. The lower cover 200 opens upward to form a first cavity 210 and has a first separating body 220 arranged in the first cavity 210. The upper cover 300 opens downward to form a second cavity 310 and has a second separating body 320 arranged in the second cavity 310. The lower cover 200 and the upper cover 300 are arranged in a way such that when the upper cover 300 is rotatably superposed on the lower cover 200, the first and second cavities 210, 310 overlap, and cooperate with the first and second separating bodies 220, 320, to co-define a first air chamber 230 and a second air chamber 240 (as shown in FIG. 2). Further, the lower cover 200 is fitted to the container 900 along the lower rim thereof.

As seen from the top, the first separating body 220 of the lower cover 200 is substantially sector-shaped and preferably occupies about a quarter of the first cavity 210. Further, the first separating body 220 has a first air channel 221 and a third air channel 222 passing through the first separating body 220.

The first air channel 221 fluidly communicates the first air chamber 230 with the container 900. An end of the first air channel 221 has a first air intake 223 which opens into the container 900 for receiving air from the container 900. Further, a first hollow base 224 is disposed at the other end of the first air channel 221 and a first check valve 225 is disposed under or in the first hollow base 224 to prevent air flowing out of the container 900 through the first air channel 221 from flowing back to the container 900. The top surface of the first hollow base 224 is substantially flush with the top surface of the first separating body 220 and a first air outlet 226 is preferably formed on the circumferential surface of the first hollow base 224, near the upper edge thereof, for communicating with the first air chamber 230.

The third air channel 222 fluidly communicates the second air chamber 240 with the container 900. An end of the third air channel 222 has a third air intake (not shown) which opens into the container 900 for receiving air from the container 900. Further, a third hollow base 227 is disposed at the other end of the third air channel 222 and a third check valve 228 is disposed under or in the third hollow base 227 to prevent air flowing out of the container 900 through the third air channel 222 from flowing back to the container 900. The top surface of the third hollow base 227 is substantially flush with the top surface of the first separating body 220 and a third air outlet 229 is preferably formed on the circumferential surface of the third hollow base 227, near the upper edge thereof, for communicating with the second air chamber 240.

As shown in FIG. 1, the second separating body 320 of the upper cover 300 is substantially sector-shaped and preferably occupies about a quarter of the second cavity 310. Further, the second separating body 320 has a second air channel 330 and a fourth air channel 340 passing through the second separating body 320.

The second air channel 330 fluidly communicates the first air chamber 230 with the external environment. An end of the second air channel 330 has a second air intake 331 which opens into the first air chamber 230 for receiving air from the first air chamber 230. A second hollow base 332 is disposed at the other end of the second air channel 330 and a second check valve 333 is disposed under or in the second hollow base 332 to prevent air flowing out of the first air chamber 230 through the second air channel 330 from flowing back to the first air chamber 230. The second hollow base 332 has a second air outlet 334 preferably formed on the circumferential surface of the second hollow base 332, near the upper edge thereof, for communicating with the external environment.

The fourth air channel 340 fluidly communicates the second air chamber 240 with the external environment. An end of the fourth air channel 340 has a fourth air intake 341 which opens into the second air chamber 240 for receiving air from the second air chamber 240. A fourth hollow base 342 is disposed at the other end of the fourth air channel 340 and a fourth check valve 343 is disposed under or in the fourth hollow base 342 to prevent air flowing out of the second air chamber 240 through the fourth air channel 340 from flowing back to the second air chamber 240. The fourth hollow base 342 has a fourth air outlet 344 preferably formed on the circumferential surface of the fourth hollow base 342, near the upper edge thereof, for communicating with the external environment.

The lower cover 200 further includes a central cannular shaft 250 linked to and communicating with the container 900 at one end and has an outer threaded portion 251 at the other end. At least one inner-side groove 252 is formed on the inner wall of the cannular shaft 250. The upper cover 300 further includes an opening 301 corresponding to the cannular shaft 250. When the upper cover 300 is superposed on the lower cover 200, the cannular shaft 250 of the lower cover 200 penetrates the opening 301 of the upper cover 300 and the outer threaded portion 251 of the cannular shaft 250 protrudes and is screwed to a cannular cap 302.

The manual vacuum device 100 further comprises a safety valve 400. As shown in FIGS. 1 and 3, the safety valve 400 is received in the cannular shaft 250. The safety valve 400 includes a rod 410 having at least one outer-side groove 411 on the wall thereof. An upper cap 420 is fixed on (e.g., screwed to) the rod 410 and a lower cap 430 is fixed to the other end of the rod 410.

In addition, a biasing element 440 and an elastic pad 450 are respectively arranged between the lower cap 430 and the upper cap 420 and contained in the cannular shaft 250. The biasing element 440 is preferably a spring. The lower cap 430 has a stepped shape and the lower cover 200 has a stepped portion 260 corresponding to the stepped-shaped lower cap 430. Under normal conditions, the upper cap 420, as well as the rod 410 and the lower cap 430, are biased upward by the biasing element 440, such that the lower cap 430 engages with the stepped portion 260 of the lower cover 200 and the outer-side groove 411 on the rod 410 is thoroughly contained in the cannular shaft 250. The cannular shaft 250 is thus fluidly separated from the container 900. The elastic pad 450 further improves the engagement between the lower cap 430 and the stepped portion 260 of the lower cover 200.

Figure 4:
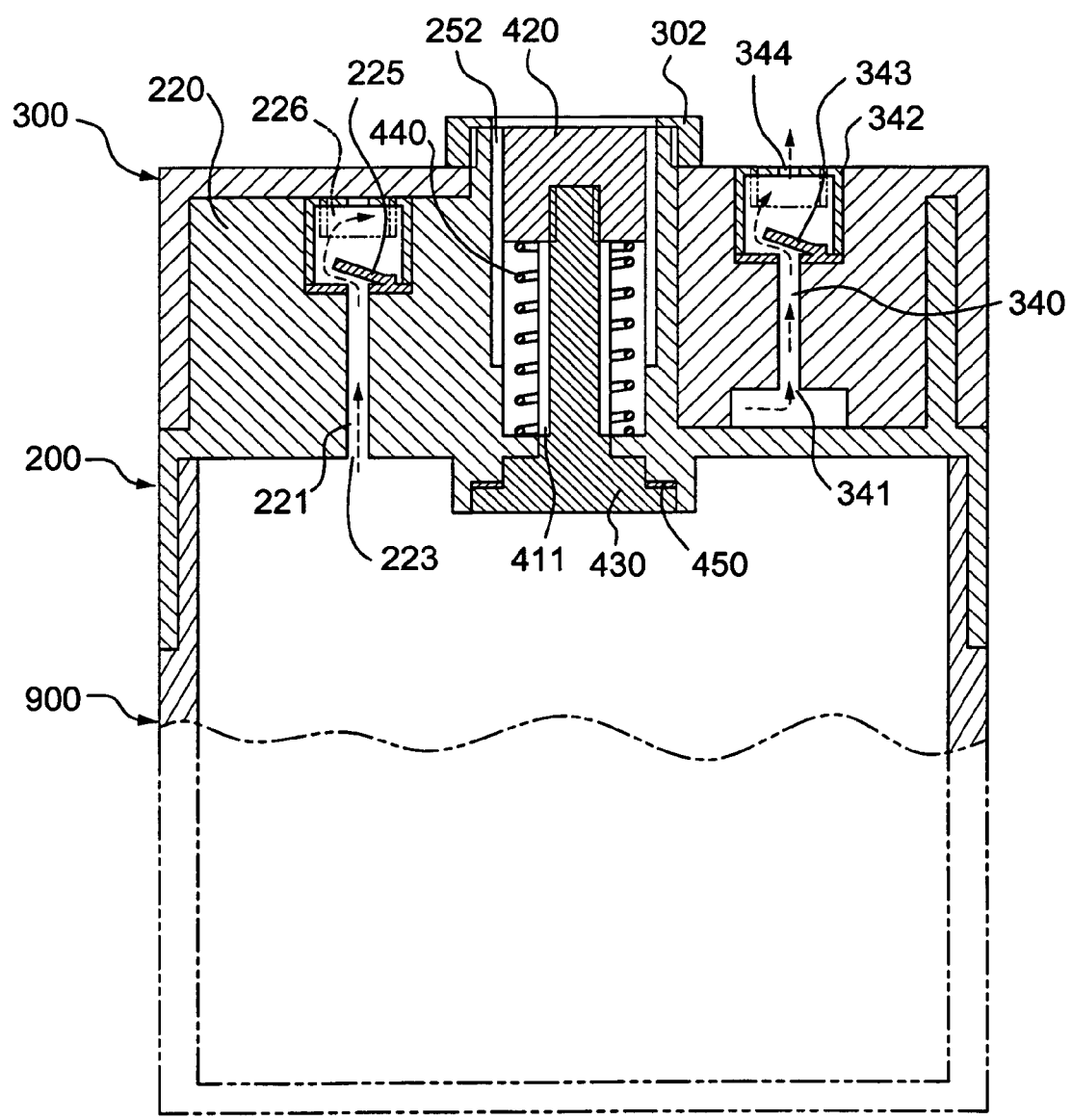
FIG. 4 illustrates a cross-sectional view of a manual vacuum device according to a first preferred embodiment of the present invention fitted to a container taken along the A-A' line in FIG. 2, wherein the first and fourth check valves are opened.

Please refer to FIGS. 2 and 4. As the upper cover 300 is turned counterclockwise relative to the lower cover 200 (along the direction of the arrow with solid lines in FIG. 2), the first air chamber 230 expands in volume and the second air chamber 240 contracts in volume due to the movement of the second separating body 320 relative to the first separating body 220. At this time, the air in the container 900 tends to flow into the first air chamber 230 due to the pressure difference between the container 900 and the first air chamber 230, and the air in the second air chamber 240 tends to flow to the external environment due to the pressure difference between the second air chamber 240 and the external environment.

To this end, as shown in FIG. 4, the air in the container 900 flows to the first air channel 221 through the first air intake 223, pushes the first check valve 225 open, flows into the first hollow base 224, and then flows into the first air chamber 230 through the first air outlet 226. At the same time, the air in the second air chamber 240 flows to the fourth air channel 340 through the fourth air intake 341, pushes the fourth check valve 343 open, flows into the fourth hollow base 342, and then flows to the external environment through the fourth air outlet 344.

Moreover, as the upper cover 300 is turned counterclockwise relative to the lower cover 200, the air in the external environment also tends to flow into the first air chamber 230 due to the pressure difference between the external environment and the first air chamber 230, and the air in the second air chamber 240 also tends to flow into the container 900 due to the pressure difference between the second air chamber 240 and the container 900. However, the air is blocked by the second check valve 333 from flowing from the external environment to the second air channel 330 through the second air outlet 334. Similarly, the air is also blocked by the third check valve 228 from flowing from the second air chamber 240 to the third air channel 222 through the third air outlet 229.

As the upper cover 300 is turned clockwise relative to the lower cover 200 (along the direction of the arrow with broken lines in FIG. 2), the first air chamber 230 contracts in volume and the second air chamber 240 expands in volume due to the movement of the second separating body 320. At this time, the air in the container 900 tends to flow into the second air chamber 240 due to the pressure difference between the container 900 and the second air chamber 240, and the air in the first air chamber 230 tends to flow to the external environment due to the pressure difference between the first air chamber 230 and the external environment.

To this end, the air in the container 900 flows to the third air channel 222 through the third air intake, pushes the third check valve 228 open, flows into the third hollow base 227, and then flows into the second air chamber 240 through the third air outlet 229. At the same time, the air in the first air chamber 230 flows to the second air channel 330 through the second air intake 331, pushes the second check valve 333 open, flows into the second hollow base 332, and then flows to the external environment through the second air outlet 334.

Moreover, as the upper cover 300 is turned clockwise relative to the lower cover 200, the air in the external environment also tends to flow into the second air chamber 240 due to the pressure difference between the external environment and the second air chamber 240, and the air in the first air chamber 230 also tends to flow to the external environment due to the pressure difference between the first air chamber 230 and the external environment. However, the air is blocked by the fourth check valve 343 from flowing from the external environment to the fourth air channel 340 through the fourth air outlet 344. Similarly, the air is also blocked by the first check valve 225 from flowing from the first air chamber 230 to the first air channel 221 through the first air outlet 226.

In summary, the air in the container 900 exhausts to the first and second air chambers 230, 240 through the first and third air channels 221, 222, and the air in the first and second air chambers 230, 240 exhausts to the external environment through the second and fourth air channels 330, 340. No air is allowed to flow into the first and second air chambers 230, 240 from the external environment, and no air is allowed to flow into the container 900 from the first and second air chambers 230, 240.

Based on the above structure, by rotating the upper cover 300 relative to the lower cover 200 back and forth, the air within the container 900 can flow to the external environment, creating a vacuum.

Please note that, in an alternative embodiment, air in the container 900 can exhaust to the external environment only through the first air chamber 230. In this case, only the first and second air channels 221, 330 and first and second check valves 225, 333 need to be disposed. Similarly, in the other alternative embodiment, air in the container 900 can exhaust to the external environment only through the second air chamber 240. In this case, only the third and fourth air channels 222, 340 and third and fourth check valves 228, 343 need to be disposed.

Figure 5:
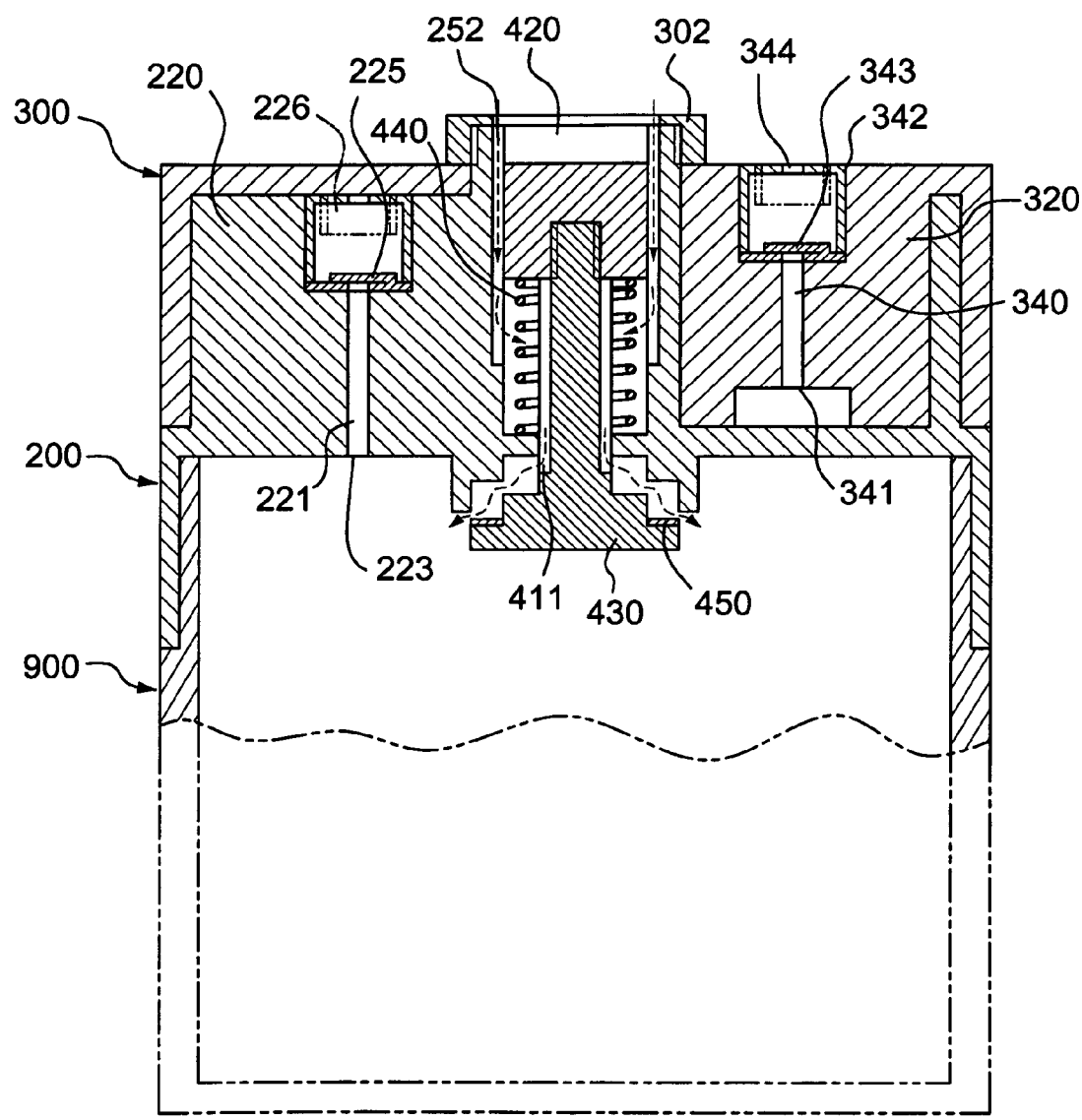
FIG. 5 illustrates a cross-sectional view of a manual vacuum device according to a first preferred embodiment of the present invention fitted to a container taken along the A-A' line in FIG. 2, wherein the safety valve is opened.

As illustrated above, under normal conditions, the upper cap 420, as well as the rod 410 and the lower cap 430, are biased upward by the biasing element 440, such that the lower cap 430 engages with the stepped portion 260 of the lower cover 200 and the outer-side groove 411 on the rod 410 is thoroughly contained in the cannular shaft 250. However, if the difference between the atmospheric pressure outside the container 900 and the vacuum pressure inside the container 900 exceeds a predetermined value, namely, the vacuum level, which can be easily determined by the biasing element 404, the safety valve 400, including the upper cap 420, rod 410 and the lower cap 430, will be pressed downward against the biasing element 440 due to the pressure difference until the outer-side groove 411 of the rod 410 fluidly communicates the cannular shaft 250 with the container 900 (as particularly shown in FIG. 5), such that the air in the external environment flows through the inner-side groove 252 into the cannular shaft 250, and then into the container 900 through the outer-side groove 411. The pressure difference is decreased due to the air flow. Once the pressure difference is decreased to a value lower than the predetermined value, the safety valve 400 is again pushed upward by the biasing element 440, such that the cannular shaft 250 and the external environment are again fluidly separated from the container 900.

Figure 6:
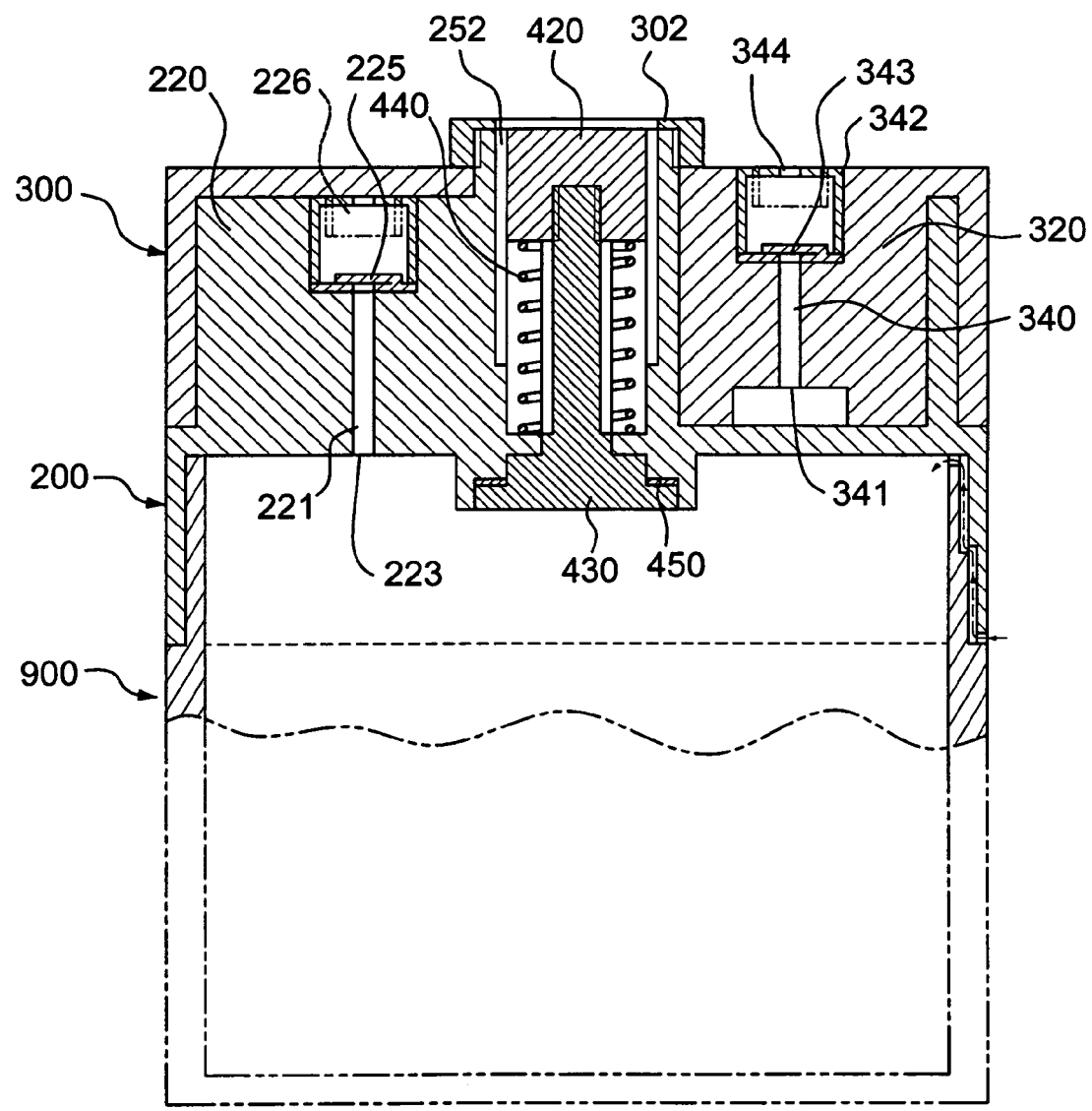
FIG. 6 illustrates a cross-sectional view of a manual vacuum device according to a first preferred embodiment of the present invention fitted to a container taken along the A-A' line in FIG. 2, showing the air flowing through the release portion and the leakage groove.

As further shown in FIGS. 1 and 6, in order to easily disengage the vacuum device 100, including the lower and upper covers 200, 300, from the container 900, the container 900 further includes a leakage groove 110 fluidly communicating with the inside of the container 900, and the lower cover 200 further includes a release portion 270 opening to the external environment and corresponding to the leakage groove 110. As a user wishes to disengage the vacuum device 100 from the container 900, he can rotate the lower cover 200 relative to the container 900 to fluidly communicate the release portion 270 with the leakage groove 110, such that the air in the external environment flows through the release portion 270 and the leakage groove 110 into the container 900 to reduce the pressure difference between the inside and outside of the container 900. Therefore, the vacuum device is easily disengaged from the container 900.

Figure 7:
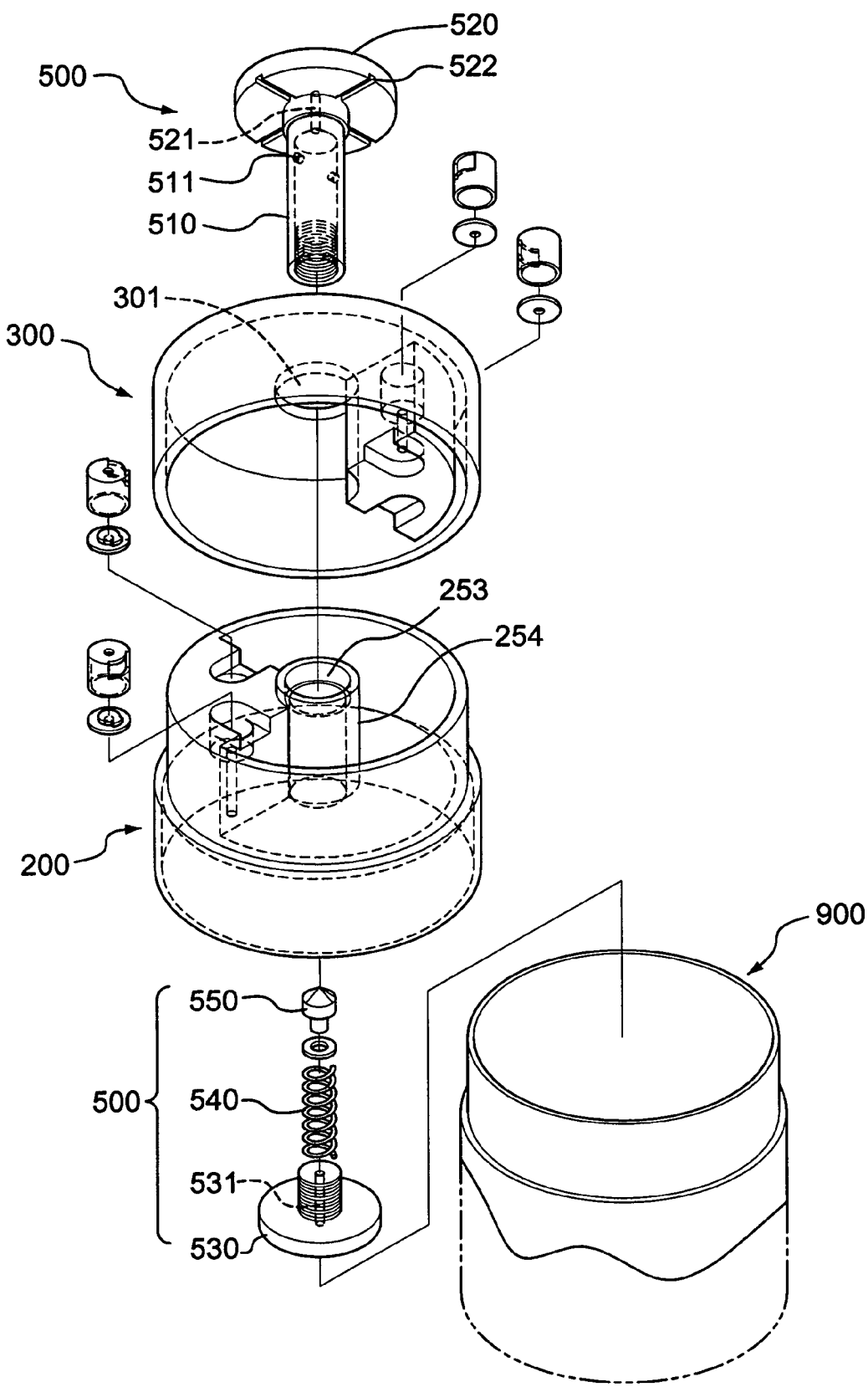
FIG. 7 illustrates an exploded view of a manual vacuum device according to a second preferred embodiment of the present invention with a container.
Figure 8:
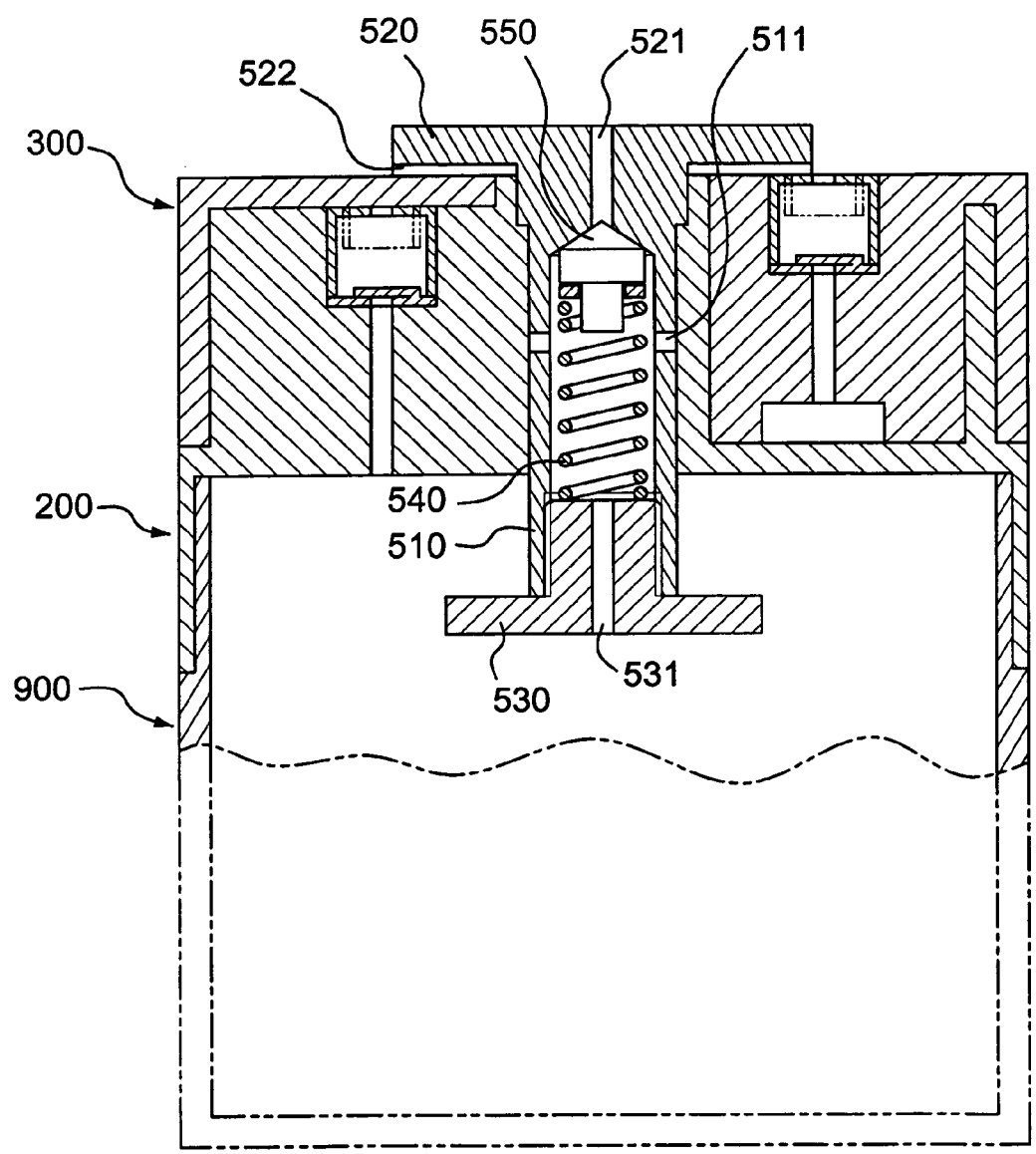
FIG. 8 illustrates a cross-sectional view of a manual vacuum device according to a second preferred embodiment of the present invention fitted to a container.
Figure 9:
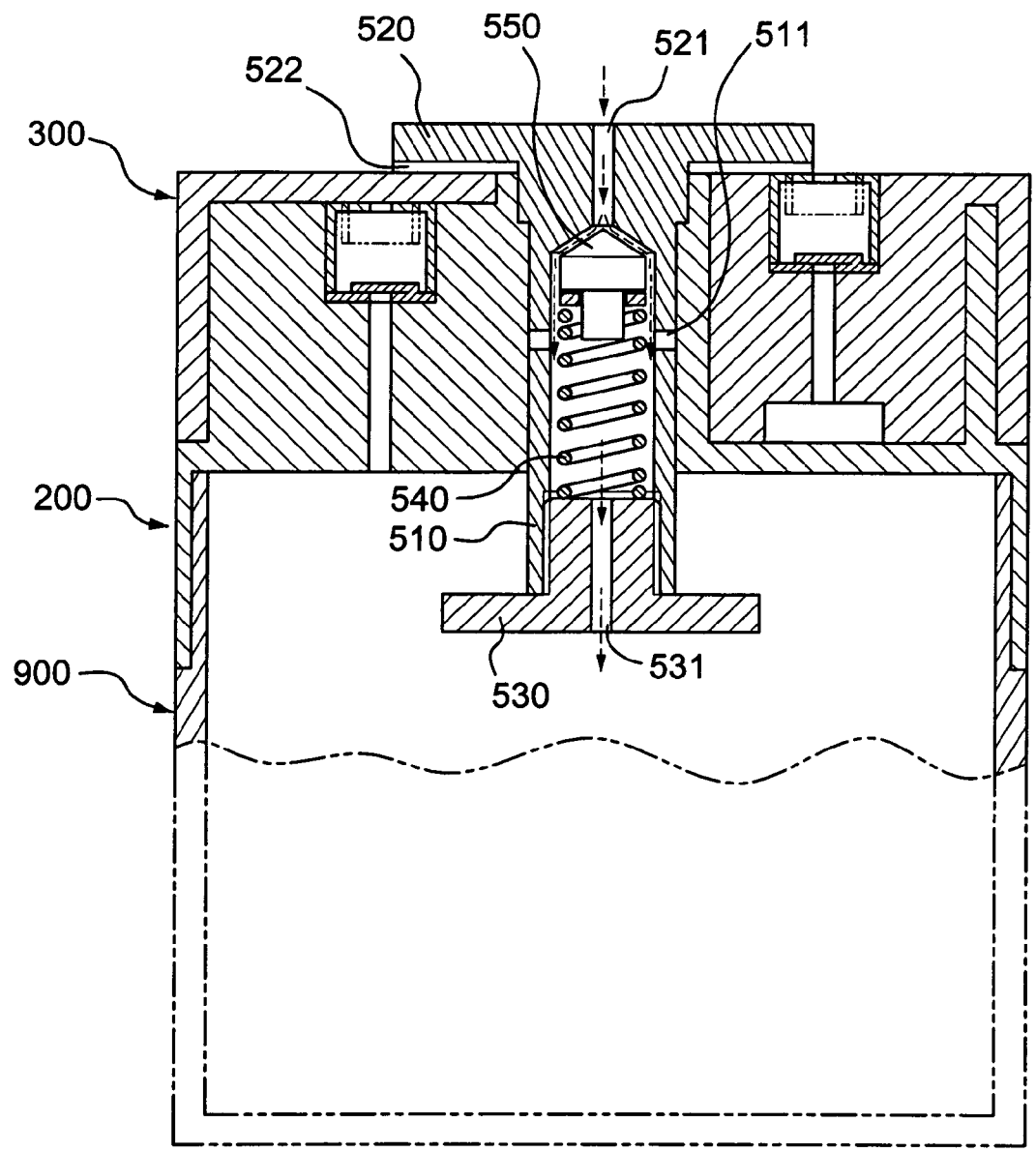
FIG. 9 illustrates a cross-sectional view of a manual vacuum device according to a second preferred embodiment of the present invention fitted to a container, wherein the safety valve is opened.

FIG. 7 illustrates an exploded view of a manual vacuum device according to a second preferred embodiment of the present invention with a container. FIG. 8 illustrates a cross-sectional view of a manual vacuum device according to the second preferred embodiment of the present invention fitted to a container. FIG. 9 illustrates a cross-sectional view of a manual vacuum device according to the second preferred embodiment of the present invention fitted to a container, wherein the safety valve is opened. As shown in the above figures, the manual vacuum device of the second preferred embodiment is substantially identical to the one of the first preferred embodiment, except for the safety valve. Therefore, the description of the vacuum device vacuumizing the container 900 in the second preferred embodiment is abbreviated to make it concise.

In the second preferred embodiment, the lower cover 200 includes a central cannular shaft 254 linked to and communicating with the container 900 at one end, and a tail groove 253 is formed at the other end of the central cannular shaft 254. The upper cover 300 includes an opening 301 corresponding to the cannular shaft 254. When the upper cover 300 is superposed on the lower cover 200, the opening 301 of the upper cover 300 overlaps the cannular shaft 254 of the lower cover 200 to receive a safety valve 500. The safety valve 500 includes a hollow tube 510 having at least one orifice 511 on the wall thereof and passing through the cannular shaft 254. An upper cap 520 is disposed on the hollow tube 510 and a lower cap 530 is fixed to (e.g., screwed to) the other end of the hollow tube 510.

The lower cap 530 has a first air passage 531 passing therethrough to fluidly communicate the container 900 with the hollow tube 510. The upper cap 520 has a second air passage 521 passing therethrough to fluidly communicate the hollow tube 510 with the external environment. A biasing element 540 and a plug 550 disposed on the biasing element 540 are arranged on the lower cap 530 and contained in the hollow tube 510. At least one lower-side groove 522 is formed on the surface of the upper cap 520 corresponding to the upper cover 300. Under normal conditions, the plug 550 is biased by the biasing element 540 to close the inlet of the second air passage 521 of the upper cap 520, such that the external environment is fluidly separated from the container 900. The biasing element 540 is preferably a spring.

Based on the above structure, when the difference between the atmospheric pressure outside the container 900 and the vacuum pressure inside the container 900 exceeds a predetermined value, namely, the vacuum level, which can be easily determined by the biasing element 540, the safety valve 500, including the plug 550 of the safety valve 500, will be pressed downward against the biasing element 540 due to the pressure difference (as particularly shown in FIG. 9), such that the air in the external environment flows through the second air passage 521 into the hollow tube 510, and then into the container 900 through the first air passage 531. The pressure difference is balanced due to the air flow. Once the pressure difference is decreased to a value lower than the predetermined value, the plug 550 of the safety valve 500 is again pushed upward by the biasing element 540, such that the external environment is again fluidly separated from the container 900.

Figure 10:
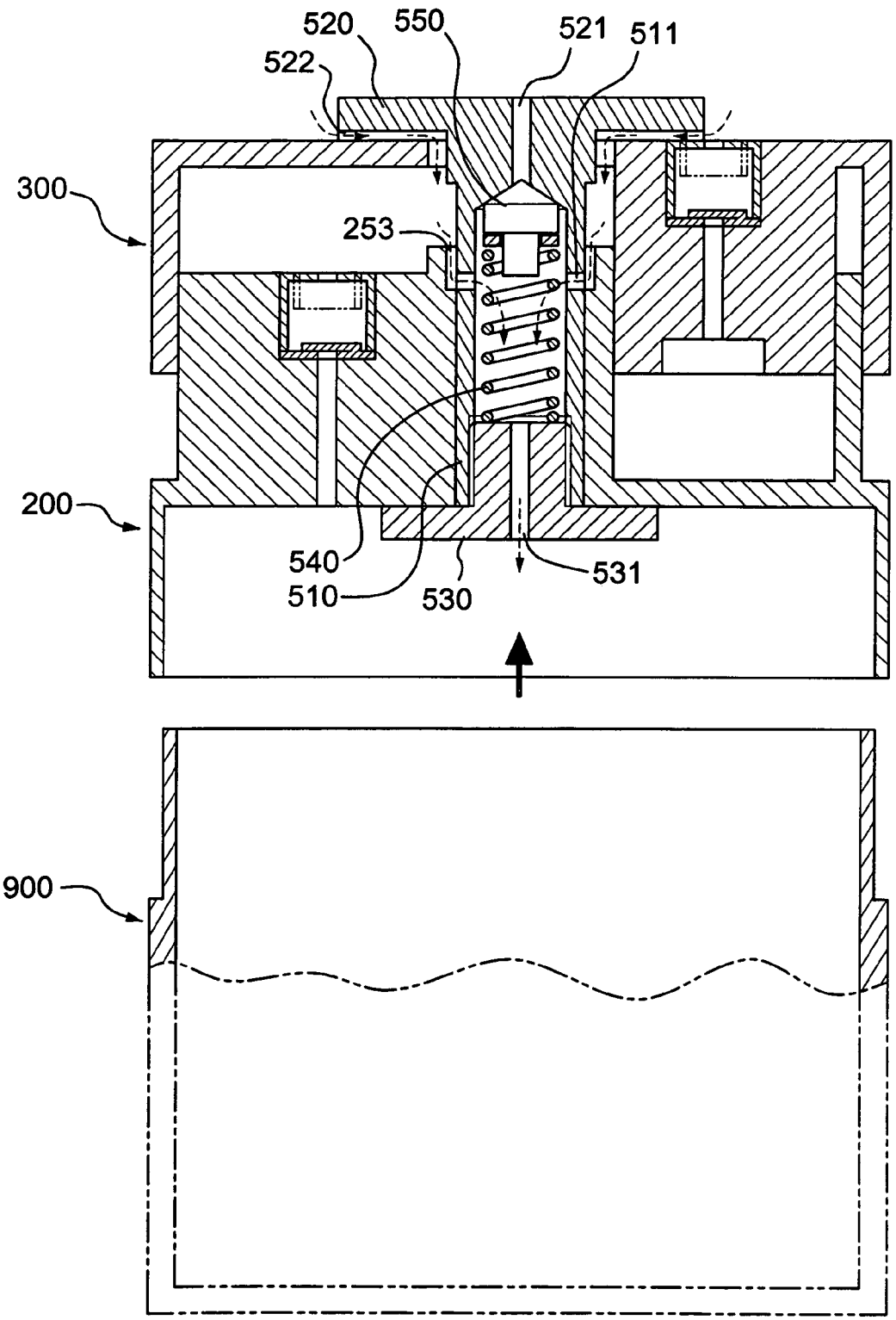
FIG. 10 illustrates a cross-sectional view of a manual vacuum device according to a second preferred embodiment of the present invention disengaged from a container.

As shown in FIG. 10, when a user wishes to disengage the vacuum device 100, including the lower and upper covers 200, 300, from the container 900, he can lift the upper cover 300 relative to the lower cover 200 to pull the safety valve 500, including the upper cap 520, the hollow tube 510 and the lower cap 530, upward until the orifice 511 of the hollow tube 510 fluidly communicates with the tail groove 253, such that the air in the external environment flows into the hollow tube 510 through the lower-side groove 522, tail groove 253 and the orifice 511, and then into the container 900 through the first air passage 531. Then, the lower cover 200 can easily be disengaged from the container 900.

Figure 11:
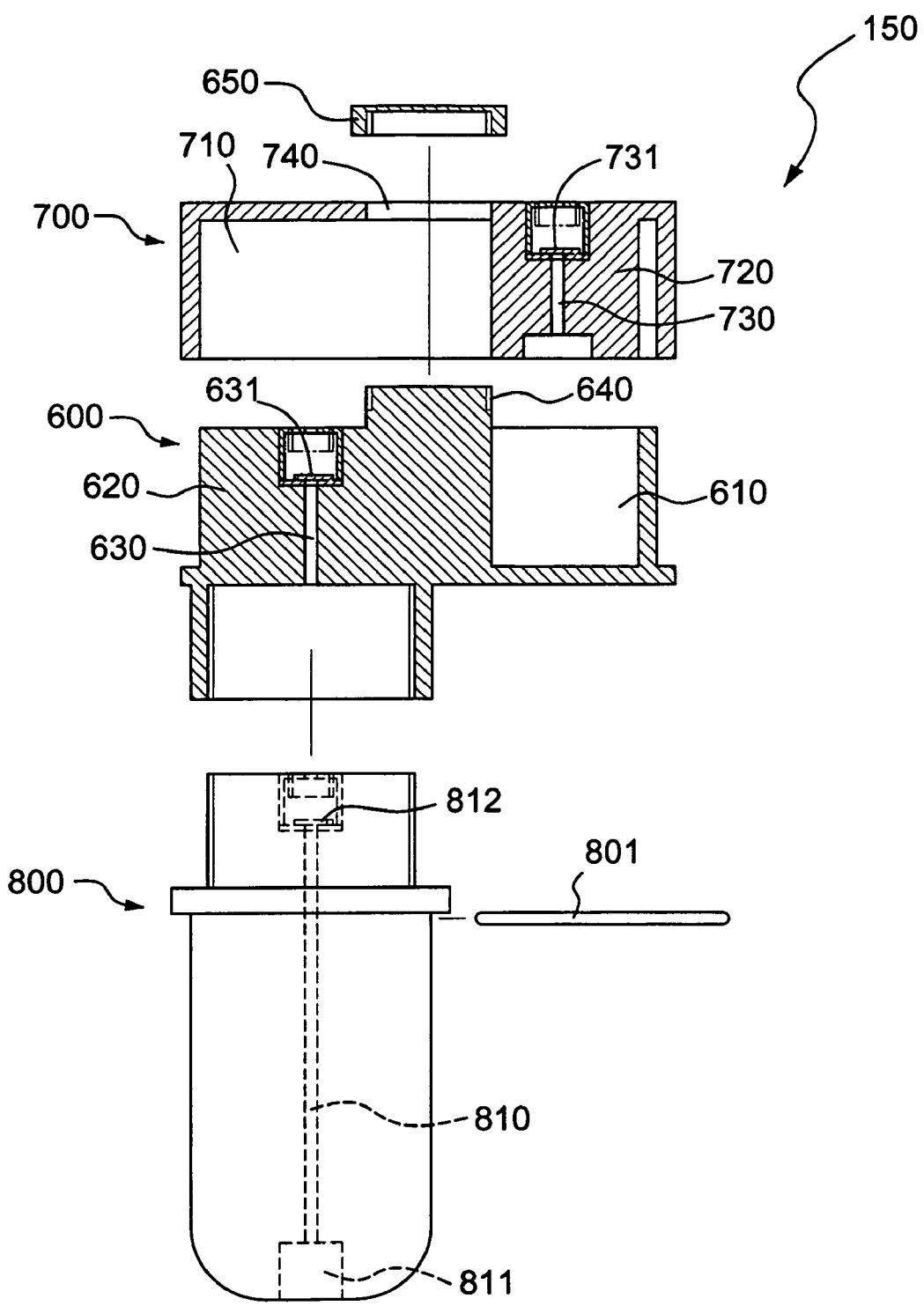
FIG. 11 illustrates an exploded view of a manual vacuum device according to a third preferred embodiment of the present invention.
Figure 12:
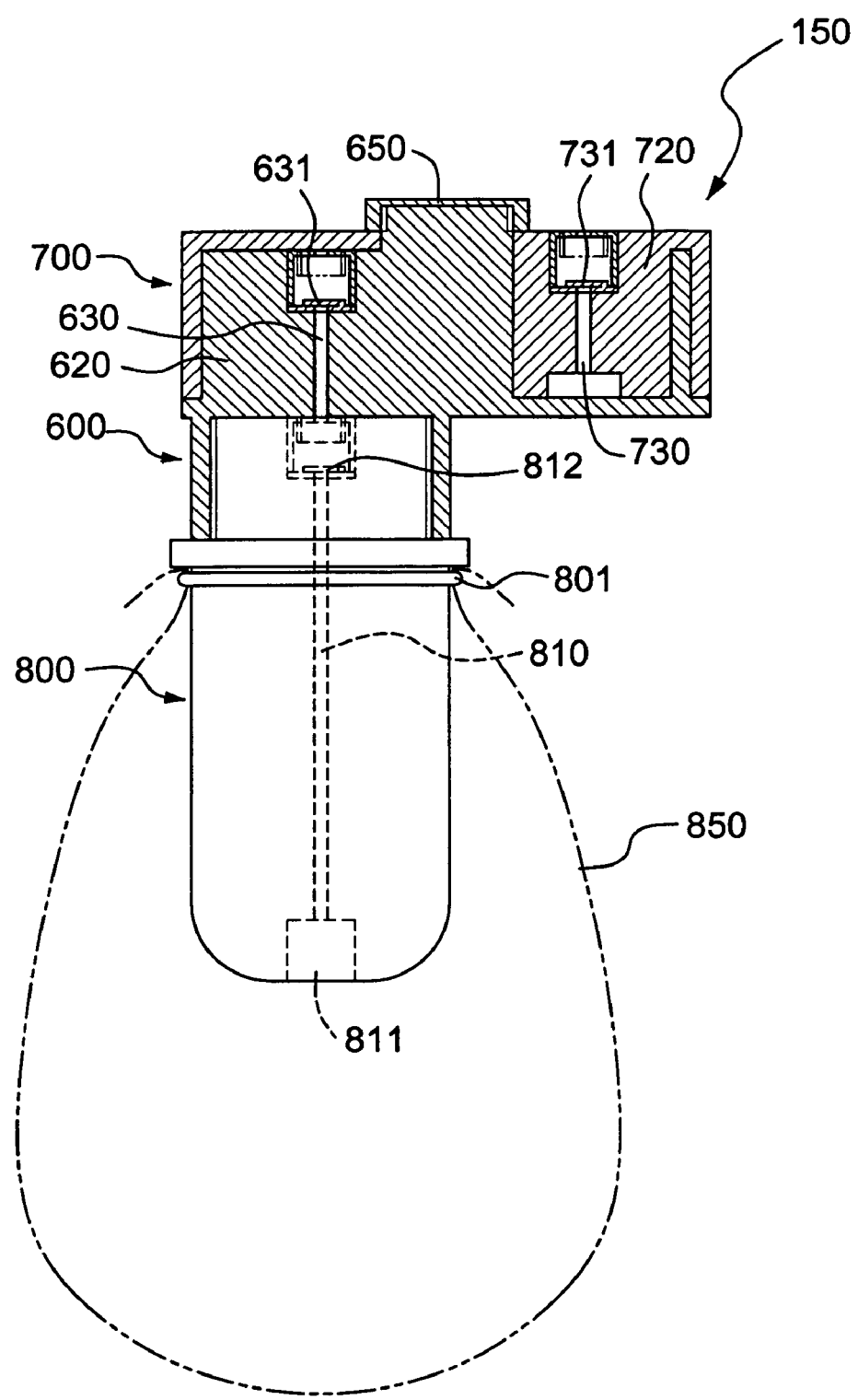
FIG. 12 illustrates a schematic view of a manual vacuum device according to a third preferred embodiment of the present invention, combined with a container.

FIG. 11 illustrates an exploded view of a manual vacuum device according to a third preferred embodiment of the present invention. FIG. 12 illustrates a schematic view of a manual vacuum device according to the third preferred embodiment of the present invention, combined with a container. As shown in the above figures, the manual vacuum device of the third preferred embodiment is adapted to provide vacuum isolation in a deformable container, such as a bag.

The manual vacuum device 150 of the third preferred embodiment comprises a cylindrical lower cover 600, a cylindrical upper cover 700 and an air faucet 800. The air faucet 800 is combined with a deformable container 850 (as shown with broken lines in FIG. 12) by a fastening device 801, e.g., a binding strap, and is used for controlling the air flowing out of the container 850 and preventing the air from flowing into the container 850. The lower cover 600 is disposed on the air faucet 800, and the upper cover 700 is rotatably superposed on the lower cover 600 and rotatably engaged with the lower cover 600 by passing a central post 640 formed on the top of the lower cover 600 through a central hole 740 formed on the upper cover 700 and securing a cap 650 to the post 640.

The lower cover 600 includes a first cavity 610 and a first separating body 620 arranged in the first cavity 610. The upper cover 700 includes a second cavity 710 and a second separating body 720 arranged in the second cavity 710. When the upper cover 700 is superposed on the lower cover 600, the first and second cavities 610, 710 overlap to form a first air chamber (not shown) defined by the first and second separating bodies 620, 720.

Moreover, the air faucet 800 includes a first air channel 810 passing therethrough, the first separating body 620 includes a second air channel 630 passing therethrough, and the second separating body 720 includes a third air channel 730 passing therethrough. The first air channel 810 fluidly communicates the container 850 with the second air channel 630. The second air channel 630 fluidly communicates the first air channel 810 with the first air chamber. The third air channel 730 fluidly communicates the first air chamber with the external environment. The first air channel 810 includes a filter 811 at one end thereof corresponding to the container 850 to prevent articles in the container 850 from entering the first air channel 810 and a first check valve 812 at the other end thereof to prevent air from flowing back to the container 850. The second air channel 630 includes a second check valve 631 therein at a side opposite to the first air channel 810 to prevent air in the first air chamber from flowing back to the first air channel 810. The third air channel 730 includes a third check valve 731 therein at a side opposite to the second air channel 630 to prevent air in the external environment from flowing back to the first chamber.

As illustrated above, the first air chamber expands and contracts in volume by the clockwise and counterclockwise movement of the upper cover 700 relative to the lower cover 600. Then, the air in the container 850 is sucked out to the external environment. After vacuumizing the container 850, a user disengages the lower cover 600 from the air faucet 800, and then a vacuum container 850 sealed by the air faucet 800 is completed.

Based on the above structures, the manual vacuum device according to the preferred embodiments of the present invention is disclosed, said device being compact in structure and easy to use anywhere as well as easy and cheap to manufacture, and easily adapted to be used for a variety of containers. Further, the vacuum level is easily adjustable and the vacuum condition can be easily released.

Although the present invention has been described in relation to particular embodiments thereof, many other variations and modifications and other uses may become apparent to those skilled in the art. It is preferred, therefore, that the present invention be limited not by the specific disclosures herein, but only by the appended claims.

What is claimed is:

1. A manual vacuum device adapted to provide vacuum isolation in a container, comprising:
   a lower cover disposed on the container and comprising a first cavity and a first separating body arranged in the first cavity, the first separating body comprising a first air channel fluidly communicating with the container and a first check valve disposed within the first air channel to prevent air from flowing into the container; and
   an upper cover comprising a second cavity and a second separating body arranged in the second cavity and rotatably disposed on the lower cover to form a first air chamber defined by the first and second separating bodies, the second separating body comprising a second air channel fluidly communicating the first air chamber with the external environment and a second check valve disposed within the second air channel to prevent air from flowing into the first air chamber from the external environment;
   wherein the air in the container flows into the first air chamber through the first air channel as the first air chamber expands by a rotational movement of the second separating body of the upper cover relative to the first separating body of the lower cover, and the air in the first air chamber flows to the external environment through the second air channel as the first air chamber contracts by a counter rotational movement of the second separating body of the upper body relative to the first separating body of the lower cover.

2. The manual vacuum device according to claim 1, wherein the first and second separating bodies further define a second air chamber as the upper cover is rotatably disposed on the lower cover, the first separating body further comprises a third air channel fluidly communicating the container with the second air chamber and a third check valve disposed within the third air channel to prevent air from flowing into the container from the second air chamber, and the second separating body further comprises a fourth air channel fluidly communicating the second air chamber with the external environment and a fourth check valve disposed within the fourth air channel to prevent air from flowing to the second air chamber from the external environment.

3. The manual vacuum device according to claim 2, wherein the air in the container flows into the second air chamber through the third air channel as the second air chamber expands by a rotational movement of the second separating body of the upper body relative to the first separating body of the lower cover, and the air in the second air chamber flows to the external environment through the fourth air channel as the second air chamber contracts by a counter rotational movement of the second separating body of the upper body relative to the first separating body of the lower cover.

4. The manual vacuum device according to claim 1, wherein the lower cover further includes a cannular shaft linked to the container to receive a safety valve, the upper cover further includes an opening corresponding to the cannular shaft, and the safety valve is closed to fluidly separate the container from the external environment under normal conditions and is opened to fluidly communicate the container with the external environment when a difference between the atmospheric pressure outside the container and the vacuum pressure inside the container exceeds a predetermined value.

5. The manual vacuum device according to claim 4, wherein at least one inner-side groove is formed on the inner wall of the cannular shaft, the safety valve includes a rod having at least one outer-side groove on the wall thereof and a biasing element arranged to bias the rod, such that the outer-side groove is thoroughly contained in the cannular shaft to fluidly separate the container from the cannular shaft in the normal condition, and if the pressure difference exceeds the predetermined value, the rod of the safety valve will be pressed against the biasing element until the outer-side groove fluidly communicates the cannular shaft with the container, such that the air in the external environment flows through the inner-side groove into the cannular shaft, and then into the container through the outer-side groove to decrease the pressure difference.

6. The manual vacuum device according to claim 5, wherein the safety valve further includes a stepped-shaped lower cap fixed to an end of the rod, the lower cover further includes a stepped portion corresponding to the stepped-shaped lower cap, and the stepped-shaped lower cap engages with the stepped portion under normal conditions to fluidly separate the container from the cannular shaft.

7. The manual vacuum device according to claim 6, wherein the safety valve further includes an elastic pad arranged on the lower cap to improve the engagement between the lower cap and the stepped portion of the lower cover.

8. The manual vacuum device according to claim 4, wherein the safety valve includes a hollow tube disposed in the cannular shaft, a lower cap fixed to the hollow tube and having a first air passage to fluidly communicate the container with the hollow tube, an upper cap disposed on the hollow tube and having a second air passage to fluidly communicate the hollow tube with the external environment, a biasing element arranged on the lower cap and in the hollow tube and a plug disposed on the biasing element to be biased by the biasing element to close an inlet of the second air passage to fluidly separate the hollow tube from the external environment in the normal condition, and if the pressure difference exceeds the predetermined value, the plug of the safety valve will be pressed downward against the biasing element, such that the air in the external environment flows through the second air passage into the hollow tube, and then into the container through the first air passage to decrease the pressure difference.

9. The manual vacuum device according to claim 8, wherein a tail groove is formed at one end of the cannular shaft corresponding to the opening, the hollow tube has at least one orifice on the wall thereof, the upper cover has at least one lower-side groove on a surface corresponding to the upper cover, and as the upper cover is lifted relative to the lower cover, the safety valve is also lifted to fluidly communicate the orifice with the tail groove, such that the air in the external environment flows into the hollow tube through the lower-side groove, tail groove and the orifice, and then into the container through the first air passage.

10. The manual vacuum device according to claim 1, wherein the container includes a leakage groove fluidly communicating with the inside of the container and the lower cover further includes a release portion linked to the external environment and corresponding to the leakage groove, and wherein the lower cover is rotatable relative to the container to fluidly communicate the leakage groove with the release portion, such that the air in the external environment flows through the release portion and the leakage groove into the container.

11. A manual vacuum device adapted to provide vacuum isolation in a container, comprising:
   an air faucet, in combination with the container, including a first air channel fluidly communicating with the container and having a first check valve therein to prevent air from flowing back to the container;
   a lower cover disposed on the air faucet and comprising a first cavity and a first separating body arranged in the first cavity, the first separating body comprising a second air channel fluidly communicating with the first air channel and a second check valve disposed within the second air channel to prevent air from flowing back to the first air channel; and
   an upper cover comprising a second cavity and a second separating body arranged in the second cavity and rotatably disposed on the lower cover to form a first air chamber defined by the first and second separating bodies, the second separating body comprising a third air channel fluidly communicating the first air chamber with the external environment and a third check valve disposed within the third air channel to prevent air from flowing back to the first air chamber from the external environment;
   wherein the air in the container flows into the first air chamber through the first and second air channels as the first air chamber expands by a rotational movement of the second separating body of the upper body relative to the first separating body of the lower cover, and the air in the first air chamber flows to the external environment through the third air channel as the first air chamber contracts by a counter rotational movement of the second separating body of the upper body relative to the first separating body of the lower cover.

12. The manual vacuum device according to claim 11, wherein the air faucet is combined with the container by a fastening device.

13. The manual vacuum device according to claim 11, wherein a filter is disposed at an end of the first air channel corresponding to the container.

* * * * *